Nov. 7, 1967          H. J. HANSEN          3,351,362
QUICK-DISCONNECTIVE COUPLING
Filed April 19, 1965
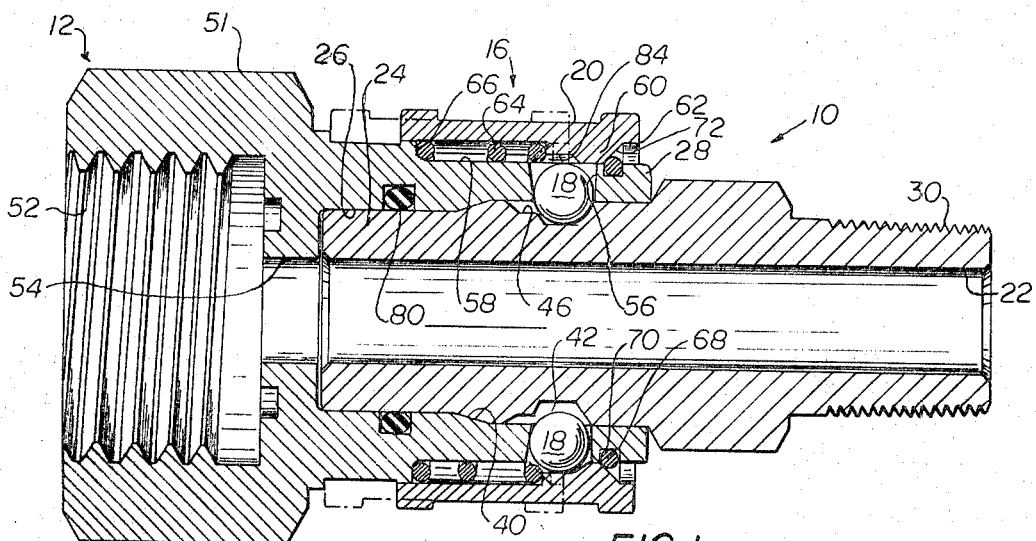
FIG. 1
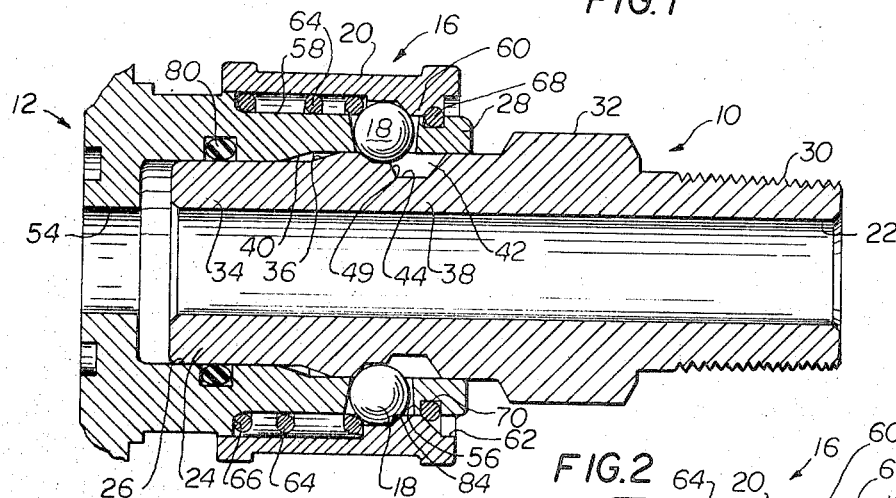
FIG. 2
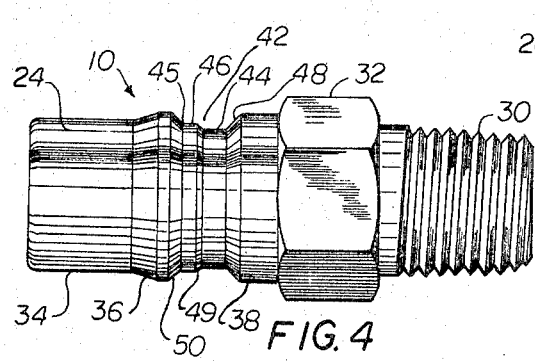
FIG. 3
FIG. 4
INVENTOR.
HOWARD J. HANSEN
BY Hoffmann and Yount
ATTORNEYS United States Patent Office 3,351,362
Patented Nov. 7, 1967

3,351,362
QUICK-DISCONNECTIVE COUPLING
Howard J. Hansen, Bay Village, Ohio, assignor to The Hansen Manufacturing Company, Cleveland, Ohio, a corporation of Ohio
Filed Apr. 19, 1965, Ser. No. 449,005
9 Claims. (Cl. 285—83)

ABSTRACT OF THE DISCLOSURE

A quick-disconnective coupling having a socket member for receiving a plug member and a coupling mechanism carried by the socket member for connecting the plug member in the socket member is disclosed. The coupling mechanism includes detents and a manually manipulatable control sleeve movable between an operative position wherein the control sleeve holds the detents in a stepped annular groove in the plug to connect the latter to the socket member and a retracted release position to permit separation of the coupling members. The detents are movable outwardly from the innermost step of the groove to the outermost step thereof and into a recess in the control sleeve to lock the plug member and the control sleeve together to prevent the latter from being moved to its retracted position when pressure within the coupling forces the plug member outwardly relative to the socket member to an outer coupling position. The detents are movable inwardly onto the innermost step of the groove to release the control sleeve for movement to its retracted position to effect separation of the coupling members when the plug member is moved inwardly relative to the socket member from its outer coupling position.

---

The present invention relates to quick-disconnective couplings, and more particularly to a quick-disconnective coupling for use in high pressure applications.

Quick-disconnective couplings are commonly employed to couple hoses and the like to high pressure outlets for a gas. When quick-disconnective couplings are used in this type of application, it is often desirable that the high pressure supply be shut off before disconnecting the hose from the outlet, particularly when the coupling is a straight through type of coupling. When straight through type of couplings are used with high pressure lines, a shut off valve is commonly provided at the outlet of the supply to enable the high pressure supply to be shut off prior to disconnecting the coupling.

While various techniques have heretofore been employed to prevent uncoupling when high pressure is on the coupling, they have generally involved mechanical interlocks between the supply valve and a movable sleeve or member for disconnecting the coupling. Such mechanical interlocks complicate the structure of the coupling and in many types of mechanical interlocks the user can remove the interlock without cutting off the high pressure supply. This, of course, presents a situation where the coupling may be disconnected without the supply being actually shut off.

Accordingly, an important object of the present invention is to provide a new and improved quick-disconnective coupling which cannot be disconnected as long as the coupling is subjected to substantial pressure.

A further object of the present invention is to provide a new and improved quick-disconnective coupling which is of a relatively simple and economical construction and which cannot be separated or disconnected with high fluid pressures on the coupling.

Another object of the present invention is to provide a new and improved quick-disconnective coupling where high pressure within the coupling acts on the coupling to prevent the coupling from being disconnected.

Yet another object of the present invention is to provide a new and improved quick-disconnective coupling having mating parts which must be relatively moved inwardly or endwise toward each other before the coupling can be disconnected.

A still further object of the present invention is to provide a new and improved quick-disconnective coupling comprising a plug member and a socket member for receiving the plug member and carrying a manually manipulatable coupling mechanism for coupling the plug and socket members together, the plug member having a construction and arrangement such that pressures within the coupling force the plug member outwardly relative to the socket member to a position where the coupling mechanism cannot be manually released unless the plug member is moved inwardly relative to the socket member which, as a practical matter, cannot be done if there is substantial pressure within the coupling.

A more specific object of the present invention is to provide a new and improved quick-disconnective coupling comprising a plug member and a socket member for receiving the plug member and carrying a manually manipulatable coupling mechanism for coupling or connecting the plug member in the socket member, the coupling mechanism including detent elements and a manually manipulatable control or locking sleeve movable between an operative position wherein the locking sleeve retains the detent elements in operative connective engagement with the plug member and a retracted release position to permit separation of the coupling members, the plug member having a construction and arrangement such that pressures within the coupling force the plug member outwardly relative to the socket member to a position wherein the detent members lock the locking sleeve such that it cannot be manually moved to its release position unless the plug member is moved inwardly relative to the socket member to a position wherein the detent members release the locking sleeve, and which inward relative movement, as a practical matter, cannot be effected if there is substantial pressure within the coupling.

Another specific object of the present invention is to provide a new and improved quick-disconnective coupling comprising a plug member and a socket member for receiving the plug member, a coupling mechanism carried by the socket member for coupling or connecting the plug member in the socket member, the coupling mechanism including a plurality of detent members and a manually manipulatable control or locking sleeve movable between an operative position wherein the locking sleeve retains the detent members in operative connective engagement with the plug member and a retracted release position to permit separation of the coupling members, the plug member having a stepped annular groove providing a pair of radially spaced step surfaces, the detent members being movable outwardly from the inner most step surface onto the outermost step surface to lock the plug member and the locking sleeve together such that the locking sleeve cannot be moved to its retracted position when pressure within the coupling forces the plug member outwardly relative to the socket member to an outer coupling position, the detent members being movable inwardly from the outermost step surface onto the innermost step surface to release the locking sleeve to permit separation of the coupling members when the plug member is moved inwardly relative to the socket member to an inner coupling position, but which inward movement cannot be effected if there is substantial pressure within the coupling.

Further objects and advantages of the present invention will be apparent to those skilled in the art to which it relates from the following detailed description of the preferred embodiment described with reference to the accompanying drawings forming a part of the present specification for all subject matter disclosed therein and wherein:

FIG. 1 is a cross-sectional view of a quick-disconnective coupling embodying the present invention and showing the relative position of the parts when connected;

FIG. 2 is a fragmentary cross-sectional view of the quick-disconnective coupling shown in FIG. 1 illustrating the relative position of the parts when the coupling is subjected to high pressures;

FIG. 3 is a fragmentary sectional view of the quick-disconnective coupling shown in FIG. 1 showing the relative position of the parts when disconnected; and FIG. 4 is a side elevational view of part of the quick-disconnective coupling embodying the present invention.

Referring to the drawings, the novel quick-disconnective coupling of the present invention is there shown as comprising, in general, a tubular male or plug member 10 which is adapted to be received within a female or socket member 12 and a coupling mechanism 16 carried by the socket member 12 for coupling or connecting the plug and socket members 10 and 12, respectively, together. The locking mechanism 16 includes a plurality of detent or coupling members 18 and a manually manipulatable spring biased control or locking element or sleeve 20 for normally retaining the detent members 18 in operative locking engagement with the plug member 10.

The plug member 10 has an axial bore or passageway 22 extending therethrough and a forward or inner end portion 24 which is adapted to be received within a complementary shaped bore or opening 26 within the inner or right end portion 28 of the socket member 12, as viewed in FIG. 1. The plug member 10 further comprises an outer or rearward end portion 30 which is externally threaded for attaching the plug to a hose or other conduit which may be connected to a tool or other device or apparatus which is to receive high pressure air. The plug member 10 is provided with a radially enlarged portion 32 having a polygonal external configuration intermediate its ends to provide wrenching surfaces.

The inner end portion 24 of the plug member 10 is here shown as comprising a first cylindrical section 34, a tapered annular shoulder 36 extending rearwardly of the first section 24 and a second generally cylindrical section 38 having a larger diameter than the first section 34 and extending rearwardly from the shoulder 36 to the enlarged portion 32. The complementary shaped opening 26 has a shoulder 40 which engages the shoulder 36 on the plug member 10 when the latter is moved to its innermost position, as shown in FIG. 1.

The inner end portion 24 of the plug member 10 between the shoulder 36 and the enlarged portion 32 is provided with an external annular stepped groove 42 for receiving the detent members 18, which in the embodiment shown are spherical balls, of the coupling mechanism 16. The annular stepped groove 42 has an inner annular step or cylindrical surface 44, a forward wall 45 which is stepped to provide an outer annular step or cylindrical surface 46 having a larger diameter than the inner step surface 44 and a tapered or beveled rear wall 48 sloping rearwardly from the surface 44. The forward wall 45, in addition to the annular step surface 46, has tapered forwardly sloping wall surfaces 49 and 50 extending between the annular surface 44 and the rearward end of the step surface 46 and from the forward end of the step surface 46 to the outer periphery of the end portion 24, respectively.

The socket member 12 includes an outer or left end portion 51, as viewed in FIG. 1, provided with an internal threaded opening 52 for attaching the socket member 12 to an outlet conduit or the like of a suitable air supply source. The end portion 51 has a polygonal external configuration to provide wrenching surfaces and has an axial passageway 54, here shown as being of the same diameter as the passageway 22 of the plug member 10, to communicate the openings 26 and 52. The socket member 12 adjacent its inner end is provided with a plurality of circumferentially spaced openings 56 in which the ball detents 18 are disposed. The openings are preferably tapered so as to have a diameter at their inner ends which is less than the diameter of the balls 18 to prevent the balls 18 from falling into the opening 26 of the socket member 12 when the plug member 10 is removed therefrom.

The ball detents 18 are retained within the openings 56 and normally held in operative connective or locking engagement with the plug member 10 by the spring biased locking sleeve 20 of the coupling mechanism 16. The locking sleeve 20, in the preferred embodiment, is slidably carried on a reduced diameter section 58 of the inner end portion 28 of the socket member 12. The sleeve 20 is axially movable relative to the socket member 12 from an operative position, as shown by the solid lines in FIG. 1, wherein an annular inwardly extending portion 60 intermediate the ends thereof covers the openings 56 and retains the ball detents 18 in operative connective or locking engagement with the plug member 10, and an inoperative or retracted position, as shown in FIG. 3 or as shown by the dotted lines of FIG. 1, wherein an annular recess 62 within the right end thereof is in registry with the openings 56 to permit the balls to be moved radially outwardly and the coupling members separated or disconnected. A compression spring 64 is interposed between an annular shoulder or abutment 66 at the left end of the reduced diameter section 58 of the socket member 12 and the annular portion 60 of the locking sleeve 20 to bias or urge the locking sleeve 20 to its operative position or toward the right, as viewed in FIG. 1. A suitable or conventional snap ring 68 disposed within an external groove 70 adjacent the inner end of the socket member 12 and engaging a tapered rearwardly sloping wall 72 of the recess 62 of the locking sleeve 20 is provided to position the locking sleeve 20 in its operative position and limit its movement toward the right.

To couple or connect the plug and socket members 10 and 12, respectively, the locking sleeve 20 is manually moved to its retracted position, as shown in FIG. 3 or indicated by the dotted lines in FIG. 1, and the end portion 24 of the plug member 10 is inserted into the complementary shaped opening 26 of the socket member 12. As the plug member 10 is moved into the socket member 12, the ball detents 18 ride on the outer surface of the cylindrical section 34 thereof until the annular shoulder 36 engages the ball detents 18 and the ball detents then move radially outwardly with respect to the axis of the plug member as its movement continues and into the annular recess 62 of the locking sleeve 20. Further movement of the plug member 10 inwardly relative to the socket member 12 causes the ball detents to ride or roll on the cylindrical section 38 thereof until the annular groove 42 is in registry with the openings 56 whereupon the ball detents drop onto the outer step surface 46 and then onto the inner step surface 44 of the annular groove 42. The inner surface 44 of the groove 42 is in registry with the openings 56 when the plug is in its innermost position, as shown in FIG. 1. The sleeve 20 is then released and the spring 64 returns it to its normal or operative position, as shown by the solid lines in FIG. 1. When the sleeve 20 is in its normal position the annular portion 60 thereof is disposed over the openings 56 and retains the ball detents 18 in a position such that the innermost portions thereof extend partially within the annular groove 42 to connect or couple the plug member 10 within the socket member 12. An O-ring 80 or suitable seal carried in an annular internal groove in the socket member provides a seal between the plug and socket members 10 and 12 when connected.

After the coupling members 10 and 12 are connected or coupled in the manner described above, the force exerted on the coupling due to the pressure differential in the internal and external pressures will move the plug member 10 outwardly relative to the socket member 12 to the position shown in FIG. 2 if the plug member 10 is not already so positioned. During this movement the ball detents 18 ride outwardly over the tapered wall surface 49 from the inner step surface 44 onto the outer step surface 46 of the groove 42 and into an annular recess 84 within the left end of the annular inwardly extending portion 60 of the locking sleeve 20, as viewed in FIG. 2. When the coupling members are in this position, the plug member 10, socket member 12 and locking sleeve 20 are coupled or connected together by the ball detents 18, and the locking sleeve 20 cannot be moved to its retracted position to permit separation of the plug and socket members because the outermost portions of the ball detents 18 interfere with the annular portion 60 of the locking sleeve 20.

To disconnect the coupling members 10 and 12, when they are in the position shown in FIG. 2, the plug member 10 must be moved inwardly relative to the socket member 12 to the position shown in FIG. 1 to allow the ball detents to be dropped or moved radially inwardly from the outer step surface 46 onto the inner step surface 44. However, if a substantial pressure differential is on the coupling, it will be extremely difficult to move the plug member 10 inwardly relative to the socket member against the force due to the pressure differential on the coupling. Therefore, inward movement of the plug member relative to the socket member, as a practical matter, can only be effected when the differential pressure on the coupling is at a low value.

From the foregoing, it can be seen that the plug member 10, when connected in the socket member 12, is axially movable relative to the socket member 12 between an outer or non-releasable locking and coupling position, as shown in FIG. 2, wherein the ball detents 18 couple the plug and socket members 10 and 12 together and lock the locking sleeve 20 against movement to its retracted position to permit separation of the coupling members, and an inner or releasable coupling position, as shown in FIG. 1, wherein the ball detents 18 couple the plug member 10 in the socket members and wherein the locking sleeve 20 can be manually moved to its retracted position to permit separation of the coupling members. It can be further seen that the interlock between the plug member 10 and locking sleeve 20, which prevents movement of the locking sleeve 20 to its retracted position, is effected by the same detent members which couple the plug member 10 in the socket member 12 and that the detent members 18 are moved into and out of locking interference with the sleeve 20 solely by axial movement of the plug member 10 outwardly relative to the socket member 12.

While the novel quick-disconnective coupling of the present invention has been described with reference to air, it will, of course, be understood that it is equally applicable for use in applications where fluids other than air are used. It will be further understood that suitable or conventional cooperating spring biased valves disposed in the passageways 22 and 54 and which close the passageways when the coupling members are disconnected could be provided, if desired.

From the foregoing, it is apparent that a novel quick-disconnective coupling of a relatively simple and economical construction and which cannot be disconnected while s substantial pressure differential is on the coupling has been provided. Morover, it will be seen that these objectives have been accomplished without requiring any additional components over that of a standard or conventional quick-disconnective coupling.

Although the novel quick-disconnective coupling of the present invention has been illustrated and described herein to a somewhat detailed extent, it will be understood, of course, that the invention is not to be regarded as limited correspondingly in scope but includes all changes and modifications coming within the terms of the claims hereof.

Having described my invention, I claim:

1. A coupling for connecting fluid conduits or the like comprising a socket member, a plug member to be received in said socket member, a coupling mechanism for connecting said members together when said plug member is received in said socket member and providing for relative movement between the plug and socket members to first and second relative positions while connected, said members moving in a direction toward each other when moving from said second position to said first position, said coupling mechanism being carried by one of said members and having a movable part cooperable with means on the other member to effect a connection between said plug and socket members when said plug member is received in said socket member, a control element axially movable relative to said one member and said movable part between a normal position in which it prevents movement of said movable part to release the connection and a release position in which said movable part may be moved to enable said members to be connected and disconnected, and means locking said control element against movement to its release position when said members are in said second position and freeing said control element for movement to said release position on relative movement of said members from said second position to said first position.

2. A coupling for connecting fluid conduits or the like comprising a socket member, a plug member to be received in said socket member, a coupling mechanism carried by said socket member for connecting said members together when said plug member is received in said socket member and providing for relative movement between plug and socket members to first and second relative positions while connected, said members moving in a direction towards each other when moving from said second position to said first position, said coupling mechanism hoving a movable part cooperable with means on the plug member to effect a connection between said plug and socket members when said plug member is received in said socket member, a manually manipulatable control element movable relative to said socket member and said movable part between a normal position in which it prevents movement of said movable part to release the connection and a release position in which said movable part may be moved to enable said members to be connected and disconnected, said mean for effecting movement of said movable part to a first position in which it is engageable with an abutment surface on said socket member and an abutment surface on said control element to lock; said control element against movement to its release position when said members are relatively moved to their second position and a second position in which it is disengageable from the abutment surface on said control element to free said control element for movement to said release position on relative movement of said members from second position to said first position.

3. A coupling for connecting fluid conduits or the like comprising a socket member, a plug member to be received in said socket member, a coupling mechanism for connecting said members together when said plug member is received in said socket member and providing for relative movement between the plug and socket members to first and second relative positions while connected, said members moving in a direction towards each other when moving from said second position to said first position, said coupling mechanism being carried by said socket member and having movable detent means cooperable with means on the plug member to connect said plug and socket members together when said plug members is received in said socket members, a manually manipulatable control sleeve having a normal position in which it prevents movement of said detent means to release the connection and movable to a release position in which said detent means may be moved to enable said members to be connected and disconnected, said detent means being engageable with an abutment surface on said socket member and an abutment surface on said control sleeve to lock said control element against movement to its release position when said members are in said second position and being disengageable from the abutment surface on said control sleeve to free said control element from movement to said release position on relative movement of said members from said second position to said first position.

4. A coupling for connecting fluid conduits or the like comprising a socket member having a plurality of circumferentially spaced openings defined by side walls, a plug member to be received in said socket member, a coupling mechanism carried by said socket member for connecting said members together when said plug member is received in said socket member and providing for relative movement between the plug and socket members to first and second relative positions while connected, said members moving in a direction towards each other when moving from said second position to said first position, said coupling mechanism comprising a plurality of movable detent elements disposed within said openings and cooperable with means on the plug member to connect said plug and socket members together when said plug member is received in said socket member, a manually manipulatable control sleeve having a normal position preventing movement of said detent elements to release the connection and movable to a release position in which said detent elements may be moved to enable said members to be connected and disconnected, said detent elements being engageable with said side walls of said opening in said socket member and engageable with an abutment surface on said control sleeve to lock said control sleeve against movement to its release position when said members are in said second position and being disengageable from said abutment surface on said control sleeve to free said control element for movement to said release position on relative movement of said members from said second position to said first position.

5. A quick disconnective coupling comprising a plug member having a stepped annular groove defining an inner step surface and and outer step surface, a socket member for receiving said plug member and having a plurality of circumferentially spaced openings, a coupling mechanism carried by said socket member for connecting said member together when said plug member is received in said socket member and providing for relative movement between the plug and socket members to first and second relative positions while connected, said coupling mechanism comprising a plurality of detent elements disposed within the openings and having portions projecting within the groove of said plug member to effect a connection between said plug and socket members when said plug member is received in said socket member, and a control sleeve having inner surface means and being movable between a normal position in which said inner surface means is engageable with said detent elements to retain portions of said detent elements within the groove of said plug member to prevent release of the connection and a release position in which said detent elements may be moved outwardly to enable said members to be connected and disconnected, said members being movable in a direction away from each other from said first position to said second position when differential pressure is on said coupling, said detent elements being disposed on said outer step surface of the groove and cooperably engageable with an abutment means on said control sleeve to lock said control sleeve against movement to its release position when said members are in said second position, said detent elements being movable from said outer step surface to said inner step surface inwardly of said socket member and out of cooperative engagement with said abutment means to free said control sleeve for movement to said release position on relative movement of said members from said second position to said first position.

6. A quick-disconnective coupling comprising a plug member having a stepped annular groove defining an inner step surface and an outer step surface, a socket member for receiving said plug member and having a plurality of circumferentially spaced openings, a coupling mechanism carried by said socket member for connecting said members together when said plug member is received in said socket member and providing for relative movement between the plug and socket members to inner and outer relative positions while connected, said coupling mechanism comprising a plurality of detent elements disposed within the openings and having portions projecting within the groove of said plug member to effect a connection between said plug and socket members when said plug member is received in said socket member, and a control sleeve having a normal position for retaining portions of said detent elements within the groove of said plug member to prevent release of the connection and movable to a release position in which said detent elements may be moved outwardly to enable said members to be connected and disconnected, said members being movable in a direction away from each other from said inner position to said outer position when differential pressure is on said coupling, said control sleeve having an inwardly facing recess defined in part by an inwardly extending wall means, said detent elements being disposed on said outer step surface of the groove and having their outermost portions received within said recess in said control sleeve and being engageable with said wall means to lock said control sleeve against movement to its release position when said members are in said outer position, said detent elements being movable from said outer step surface to said inner step surface inwardly of said socket member in which their outermost portions are not disposed in said recess to free said control sleeve for movement to said release position on relative movement of said members from said outer position to said inner position.

7. A quick-disconnective coupling, as defined in claim 6, wherein said coupling mechanism includes a spring interposed between said socket member and said control sleeve to bias said control sleeve toward its normal position.

8. A quick-disconnective coupling, as defined in claim 6, wherein said control sleeve is axially movable relative to said socket member between said normal and release positions.

9. A coupling for connecting fluid conduits or the like comprising a socket member, a plug member to be received in said socket member, a coupling mechanism for connecting said members together when said plug member is received in said socket member and providing for relative movement between the plug and socket members to first and second relative positions while connected, said members moving in a direction toward each other when moving from said second position to said first position, said coupling mechanism being carried by one of said members and having a movable part cooperable with means on the other member to effect a connection between said plug and socket members when said plug member is received in said socket member, a control element axially movable relative to said one member and said movable part between a normal position in which it prevents movement of said movable part to release the connection and a release position in which said movable part may be moved to enable said members to be connected and disconnected, and means for effective movement of said movable part to a first position in which it is engageable with an abutment surface on said one member and an abutment surface on said control element to positively lock said control element against movement to its release position when said members are relatively moved to their second position and a second position in which it is disengageable from the abutment surface on said control element to free said control element for movement to said release position on relative movement of said members from said second position to said first position.

References Cited

UNITED STATES PATENTS

| 2,125,677 | 8/1938 | Kuchenmeister | 285—321 X |
| 2,548,528 | 4/1951 | Hansen | 285—316 X |
| 2,744,770 | 5/1956 | Davidson et al. | 285—316 |
| 3,120,968 | 2/1964 | Lalvin | 285—277 |
| 3,138,393 | 6/1964 | Livingston | 285—277 |
| 3,285,283 | 11/1966 | Calvin | 285—315 X |

CARL W. TOMLIN, *Primary Examiner.*

R. G. BERKLEY, *Assistant Examiner.*

UNITED STATES PATENT OFFICE
CERTIFICATE OF CORRECTION

Patent No. 3,351,362 November 7, 1967

Howard J. Hansen

It is hereby certified that error appears in the above numbered patent requiring correction and that the said Letters Patent should read as corrected below.

Column 5, line 67, for "Morover" read -- Moreover --; column 6, line 39, for "hoving" read -- having --; line 48, for "said mean" read -- and means --; line 52, for "lock;" read -- lock --; line 71, for "members", second occurrence, read -- member --; line 72, for "members" read -- member --; column 7, line 8, for "from" read -- for --; line 44, for "surface and and" read -- surface and an --; line 48, for "member", first occurrence, read -- members --; column 8, line 68, for "effective" read -- effecting --.

Signed and sealed this 22nd day of April 1969.

(SEAL)
Attest:

Edward M. Fletcher, Jr.
Attesting Officer

EDWARD J. BRENNER
Commissioner of Patents